United States Patent
Lee et al.

(10) Patent No.: US 11,846,855 B2
(45) Date of Patent: *Dec. 19, 2023

(54) COLOR FILTER SUBSTRATE AND IN-CELL TOUCH TYPE DISPLAY DEVICE INCLUDING THE SAME

(71) Applicant: LG Display Co., Ltd., Seoul (KR)

(72) Inventors: Sujeong Lee, Seoul (KR); Sunghee Kim, Paju-si (KR); Changeun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,616

(22) Filed: Jan. 17, 2023

(65) Prior Publication Data
US 2023/0152641 A1    May 18, 2023

Related U.S. Application Data

(63) Continuation of application No. 17/541,125, filed on Dec. 2, 2021, now Pat. No. 11,586,082.

(30) Foreign Application Priority Data

Dec. 28, 2020  (KR) .......................... 10-2020-0184528

(51) Int. Cl.
*G02F 1/1368* (2006.01)
*G02F 1/1362* (2006.01)

(52) U.S. Cl.
CPC ...... *G02F 1/136222* (2021.01); *G02F 1/1368* (2013.01); *G02F 1/136286* (2013.01)

(58) Field of Classification Search
CPC .......................... G02F 1/136222; G02F 1/1368
See application file for complete search history.

(56) References Cited

U.S. PATENT DOCUMENTS

| | | | |
|---|---|---|---|
| 5,870,160 A * | 2/1999 | Yanagawa | G02F 1/136204 349/110 |
| 9,470,941 B2 | 10/2016 | Park et al. | |
| 11,586,082 B2 * | 2/2023 | Lee | G02F 1/136286 |
| 2004/0140198 A1 * | 7/2004 | Cho | C23C 14/086 204/192.29 |
| 2012/0138966 A1 * | 6/2012 | Shin | H10K 50/865 257/E33.012 |
| 2012/0206675 A1 | 8/2012 | Seo et al. | |
| 2013/0044074 A1 | 2/2013 | Park et al. | |
| 2015/0184280 A1 | 7/2015 | Medvedovski et al. | |
| 2022/0107536 A1 * | 4/2022 | Fujikawa | G02F 1/134327 |

FOREIGN PATENT DOCUMENTS

| KR | 10-2003-0076917 A | 9/2003 |
|---|---|---|
| KR | 10-2014-0041949 A | 4/2014 |

\* cited by examiner

*Primary Examiner* — James A Dudek
(74) *Attorney, Agent, or Firm* — Fenwick & West LLP

(57) ABSTRACT

A color filter substrate and an in-cell touch type display device including the same, in which a low-reflective high-resistance film is disposed on a top face of the color filter substrate. Due to the low-reflective high-resistance film, a finger capacitance is generated, an antistatic path is formed, and reflectance of the display device is improved.

20 Claims, 10 Drawing Sheets

COLOR FILTER SUBSTRATE AND IN-CELL TOUCH TYPE DISPLAY DEVICE INCLUDING THE SAME

CROSS-REFERENCE TO RELATED APPLICATION

This application is a continuation application of U.S. patent application Ser. No. 17/541,125 filed on Dec. 2, 2021, which claims a benefit under 35 U.S.C. § 119(a) of Korean Patent Application No. 10-2020-0184528 filed on Dec. 28, 2020, in the Korean Intellectual Property Office, all of which are incorporated herein by reference for all purposes.

BACKGROUND

Field

The present disclosure relates to a color filter substrate. More specifically, the present disclosure relates to a color filter substrate having a low-reflective high-resistance film.

Further, the present disclosure relates to an in-cell touch type display device including a color filter substrate having a low-reflective high-resistance film.

Description of Related Art

A display device displays an image. Recently, along with development of display technology, a flat display device has been widely used. The flat display device includes a liquid crystal display device, an organic electroluminescent display device, and a micro LED display device.

The flat display device operates in response to a stimulus, that is, a touch applied to a device surface to provide user convenience. In other words, the flat display device has a function of a touch panel.

Accordingly, the flat display device including the touch panel function is applied to various fields including monitors such as navigations, industrial terminals, notebook computers, financial automation devices, and game consoles, portable terminals such as mobile phones, MP3, PDA, PMP, PSP, portable game consoles, and DMB receivers, and home appliances such as refrigerators, microwave ovens, washing machines, etc.

In order to include the touch panel function into the flat panel display device, there are a method of manufacturing a separate touch screen (touch panel) and attaching the same to a display panel, and a method of directly forming a touch element on a display panel.

A method of attaching a separate touch screen to the display panel may be a complicated process and may increase a thickness of the display device.

In the method of directly forming the touch element on the display panel, static electricity may be generated on a color filter substrate due to frequent user touches, and thus a touch sensing performance may be degraded by such static electricity.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a color filter substrate having excellent touch sensing effect and excellent electrostatic discharge effect.

In addition, a purpose of the present disclosure is to provide an in-cell touch type display device including a color filter substrate excellent in both the touch detection effect and the electrostatic discharge effect.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides a color filter substrate comprising: a first substrate; a color filter disposed on a bottom face of the first substrate; and an upper film disposed on a top face of the first substrate, wherein the upper film is made of $In_2O_3$ and further contains 13 to 15% by weight of $SiO_2$ and 10% or smaller by weight of $SnO_2$.

In one implementation of the color filter substrate, the upper film has a sheet resistance of $10^6$ to $10^8$ Ω/sq.

In one implementation of the color filter substrate, the upper film has a thickness of 50 to 200 Å.

In one implementation of the color filter substrate, the color filter substrate further comprises a polarizing plate disposed on a top face of the upper film.

Another aspect of the present disclosure provides an in-cell touch type display device comprising: a device substrate in which a plurality of pixel areas are defined, wherein a thin-film transistor and a touch line are disposed on the device substrate; and a color filter substrate disposed on the device substrate, wherein the color filter substrate includes: a first substrate; a color filter disposed on a bottom face of the first substrate; and an upper film disposed on a top face of the first substrate, wherein the upper film is made of $In_2O_3$ and further contains 13 to 15% by weight of $SiO_2$ and 10% or smaller by weight of $SnO_2$.

In one implementation of the in-cell touch type display device, the device substrate includes: a second substrate; a gate line and a data line disposed on a top face of the second substrate and intersecting with each other to define a pixel area; a thin-film transistor disposed in an intersection between the gate line and the data line; a protective layer disposed on a top face of the thin-film transistor; a pixel electrode disposed on a top face of the protective layer and connected to a drain electrode of the thin-film transistor; a common electrode overlapping with the pixel electrode; and a touch line electrically connected to the common electrode.

In one implementation of the in-cell touch type display device, the common electrode is separately divided into a plurality of touch blocks, each block including some pixel areas among a plurality of pixel areas.

In one implementation of the in-cell touch type display device, each touch line is electrically connected to each touch block of the common electrode.

In one implementation of the in-cell touch type display device, the upper film has a sheet resistance of $10^6$ to $10^8$ Ω/sq.

In one implementation of the in-cell touch type display device, the upper film has a thickness of 50 to 200 Å.

In one implementation of the in-cell touch type display device, the in-cell touch type display device further comprises a polarizing plate disposed on a top face of the upper film.

Effects in accordance with the present disclosure may be as follows but may not be limited thereto.

According to the color filter substrate according to the present disclosure and the in-cell touch type display device including the same, the high resistance film is formed on a top face of the color filter substrate. The high resistance film on the top face of the color filter substrate makes it possible to generate a finger capacitance between a finger contacting a top of the color filter substrate and a common electrode of a device substrate.

Further, the color filter substrate according to the present disclosure and the in-cell touch type display device including the same may discharge static electricity via the high resistance film on the top face of the color filter substrate, such that a separate film for discharging the static electricity may not formed on the high resistance film.

Further, in the color filter substrate according to the present disclosure and the in-cell touch type display device including the same, the high resistance film formed on the top face of the color filter substrate exhibits a low visible light reflectance, thereby improving visibility of the in-cell touch type display device.

In addition to the effects as described above, specific effects in accordance with the present disclosure will be described together with the detailed description for carrying out the disclosure.

DETAILED DESCRIPTIONS

Figure 1:
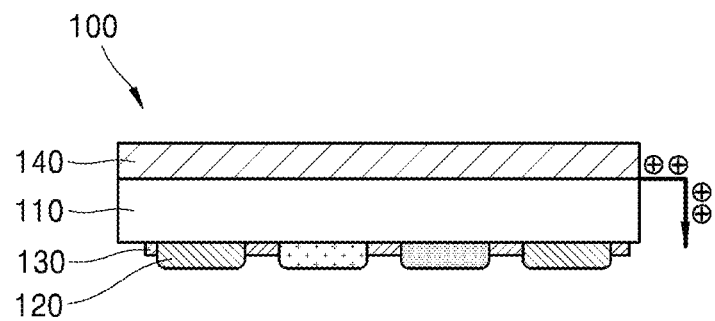
FIG. 1 schematically shows a color filter substrate according to an implementation of the present disclosure.

Advantages and features of the present disclosure, and a method of achieving the Advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred implementations of a color filter substrate according to the present disclosure and an in-cell touch type display device including the same will be described in detail with reference to the accompanying drawings. In the drawings, the same reference numerals are used to indicate the same or similar elements.

FIG. 1 schematically shows a color filter substrate according to an implementation of the present disclosure.

Referring to FIG. 1, a color filter substrate 100 includes a first substrate 110, a color filter 120, and an upper film 140.

The first substrate 110 may be made of glass or plastic.

The color filter 120 is disposed on a bottom face of the first substrate 110. More specifically, the first substrate 110 may be divided into a light-transmissive area and a light-blocking area. The color filter 120 may be disposed in the light-transmissive area and on a bottom face of the first substrate 110. A black matrix 130 may be disposed in the light-blocking area and on a bottom face of the first substrate 110.

The upper film 140 is disposed on a top face of the first substrate 110. In the present disclosure, the upper film 140 performs a touch function and an electrostatic discharge function.

In the present disclosure, the upper film 140 is made of $In_2O_3$ containing 13 to 15% by weight of $SiO_2$ and 10% or smaller by weight of $SnO_2$. The upper film having the above composition may exhibit higher sheet resistance than that of ITO (Indium Tin Oxide).

For example, when the upper film is made of an ITO material having a sheet resistance of $10^3$ Ω/sq which is relatively low, the upper film may perform an electrostatic discharge function, but may not generate finger capacitance between a finger contacting a top face of the color filter substrate and a common electrode of the device substrate, such that the touch performance may be degraded. Conversely, when the upper film is absent, while the finger capacitance may be generated, the electrostatic discharge may not occur. Thus, a separate electrostatic discharge path must be provided. Therefore, the present inventors have conducted a lot of research and have found that when the sheet resistance of the upper film 140 is in a range of $10^6$ to $10^8$ Ω/sq, both the touch function and the electrostatic discharge function may be performed well.

In accordance with the present disclosure, the upper film 140 is based on $In_2O_3$ as a transparent conductive material.

$SiO_2$ included in the upper film 140 serves to increase resistance of the upper film 140. In particular, among oxide materials, $SiO_2$ has the lowest refractive index, high bonding strength, and a large band gap, and secures high resistance compared to ITO and improves transmittance. When a content of $SiO_2$ is smaller than 13% by weight, the transmittance of the upper film may decrease and the reflectance may increase. To the contrary, when the content of $SiO_2$ exceeds 15% by weight, the sheet resistance of the upper film may be too high, thereby making it difficult to perform the electrostatic discharge function.

$SnO_2$ together with $In_2O_3$ prevents the resistance of the upper film from becoming too high. In accordance with the present disclosure, the upper film is required to have a certain high sheet resistance, $SnO_2$ may not be included in the upper film. When the content of $SnO_2$ exceeds 10% by weight and is too high, the transmittance of the upper film may be lowered.

As described above, the upper film 140 made of $In_2O_3$ and including 13 to 15% by weight of $SiO_2$ and 10% or smaller by weight of $SnO_2$ in combination with a process condition such as the oxygen partial pressure during the deposition may exhibit a sheet resistance of $10^6$ to $10^8$ Ω/sq. Further, the upper film 140 may exhibit a transmittance of 97% or greater and a reflectance of 9.5% or smaller.

The upper film may have a thickness of 50 to 200 Å, that is, 5 to 20 nm. A thickness of 120 to 180 Å is more preferable. The thinner the upper film is, the better the transmittance is. However, when the upper film is too thin (smaller than 50 Å), the sheet resistance of the upper film is greatly increased such that the electrostatic discharge performance may be degraded. In one example, when the thickness of the upper film exceeds 200 Å, the transmittance may decrease and the reflectance may increase.

Figure 2:
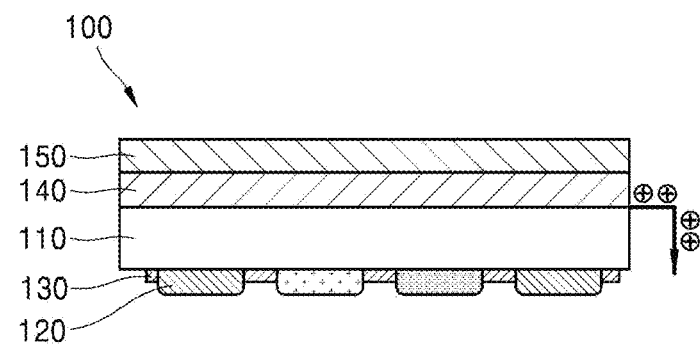
FIG. 2 schematically shows a color filter substrate according to another implementation of the present disclosure.

FIG. 2 schematically shows a color filter substrate according to another implementation of the present disclosure.

The color filter substrate shown in FIG. 2 includes the first substrate 110, the color filter 120, and the upper film 140 as in the color filter substrate shown in FIG. 1.

In one example, the color filter substrate shown in FIG. 2 additionally has a polarizing plate 150 disposed on a top face of the upper film 140. The polarizing plate 150 allows linearly polarized light to be selected from randomly mixed unpolarized light and to transmit the linearly polarized light therethrough in a specific direction. Further, the polarizing plate 150 suppresses a decrease in visibility due to reflection by external light.

As described above, when the upper film does not exist, electrostatic discharge does not occur through the first substrate. Thus, the polarizing plate is coated with a conductive material for electrostatic discharge. However, in accordance with the present disclosure, electrostatic discharge may be achieved via the upper film 140. Thus, even when the polarizing plate is contained in the color filter substrate, the conductive material coating for electrostatic discharge on the polarizing plate is not required.

Figure 3:
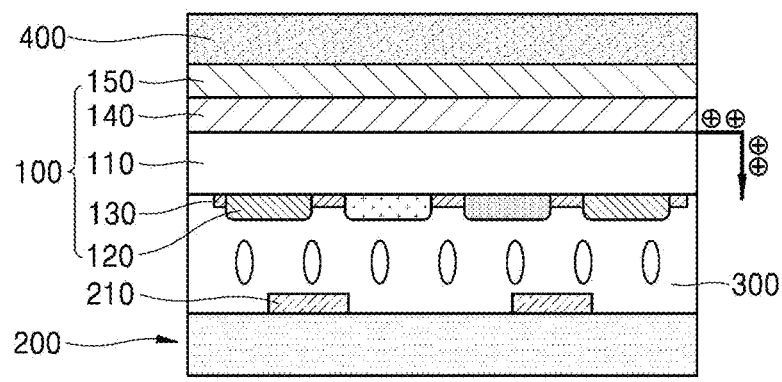
FIG. 3 schematically shows an in-cell touch type display device according to an implementation of the present disclosure.

FIG. 3 schematically shows an in-cell touch type display device according to an implementation of the present disclosure.

Referring to FIG. 3, the in-cell touch type display device according to the present disclosure includes the color filter substrate 100 and a device substrate 200.

The color filter substrate 100 is disposed on a top face of the device substrate 200.

As described above, the color filter substrate 100 includes the first substrate 110, the color filter 120 disposed on a bottom face of the first substrate, and the upper film 140 disposed on a top face of the first substrate.

The upper film 140 of the color filter substrate 100 is based on $In_2O_3$ and further contains 13 to 15% by weight of $SiO_2$ and 10% or smaller by weight of $SnO_2$.

The upper film 140 of the color filter substrate 140 may have a sheet resistance of $10^6$ to $10^8$ Ω/sq.

Further, the upper film 140 may have a thickness of 50 to 200 Å.

The polarizing plate 150 may be additionally disposed on a top face of the upper film 140 of the color filter substrate 140.

In the device substrate 200, a plurality of pixel areas are defined. A thin-film transistor and a touch line are disposed on a top face of the device substrate 200. According to the present disclosure, a display device in which a touch line for transmitting a touch signal is disposed on a top face of the device substrate 200 is referred to as an in-cell type display device.

In FIG. 3, a liquid crystal layer 300 is disposed between the color filter substrate 100 and the device substrate 200. Further, a cover layer 400 such as a cover glass may be disposed on a top face of the color filter substrate 100.

FIG. 3 shows an example of an in-cell touch type liquid crystal display device. However, the present disclosure is not limited thereto but may be applied to an in-cell touch type OLED display device or an in-cell touch type micro LED display device.

Figure 4:
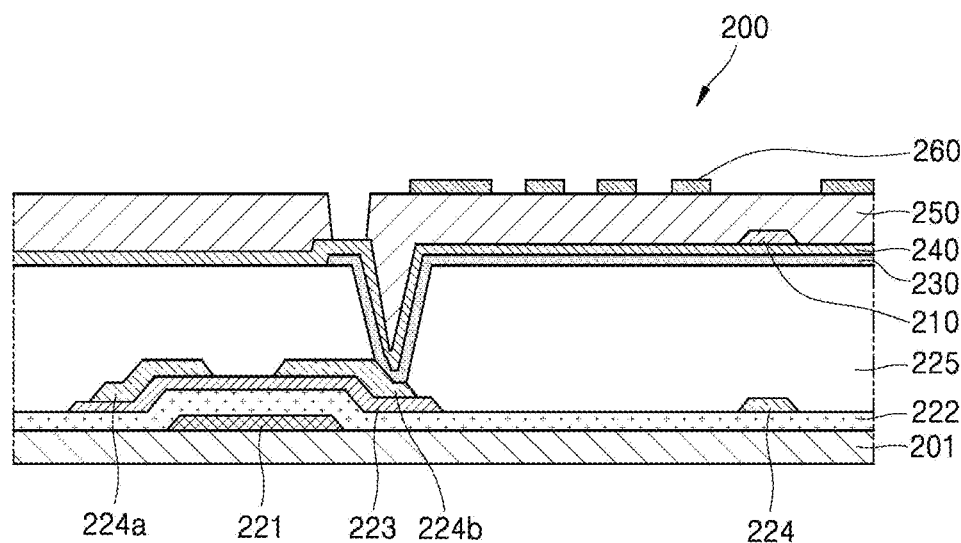
FIG. 4 schematically shows a device substrate that may be used in an in-cell touch type display device according to an implementation of the present disclosure.

FIG. 4 schematically shows the device substrate 200 that may be used in an in-cell touch type display device according to an implementation of the present disclosure.

Pixel areas of the device substrate 200 are defined by gate lines and data lines intersecting with each other and disposed on a second substrate 201. A thin-film transistor is disposed in an intersection area between the gate line and the data line.

The gate line (not shown) and a gate electrode 221 branching from the gate line are disposed on a top face of the second substrate 201.

A gate insulating film 222 is disposed on a top face of the second substrate 201 on which the gate electrode is disposed.

An active layer 223 is disposed on a top face of the gate insulating film 222.

A source electrode 224a branched from a data line 224, and a drain electrode 224b spaced apart from the source electrode are disposed on a top face of the active layer 223.

A protective layer 225 is formed on the gate insulating film 222 on which the thin-film transistor is disposed. The protective layer 225 may be made of an insulating inorganic material such as SiO2 and SiN, or an insulating organic material such as PAC (Photo Acryl Compound) and may be comprised of one or more layers. When the protective layer 225 has a multilayer structure, it is preferable that a topmost layer thereof is made of PAC for planarization.

A pixel electrode 230 is disposed on a top face of the protective layer. The pixel electrode 230 is connected to the drain electrode 224b of the thin-film transistor via a contact hole.

A common electrode 260 overlaps with the pixel electrode 230 and the protective film 250 while being interposed therebetween. In FIG. 4, a structure (Vcom TOP structure) in which the common electrode 260 acts as a topmost layer is presented. However, the present disclosure is not limited thereto. A structure (PXL TOP structure) in which the pixel electrode 230 acts as the topmost layer may be presented.

The touch line 210 is electrically connected to the common electrode 260. The touch line 210 may overlap with the data line 224. FIG. 4 shows an example in which an additional protective film 240 is disposed on the protective film 225 on which the pixel electrode 230 is disposed, and the touch line 210 is disposed on a top face of the additional protective film 240 and overlaps with the data line 224. However, this is merely an example. Any touch line applied to a known in-cell type display device may be applied to the present disclosure.

Figure 5:
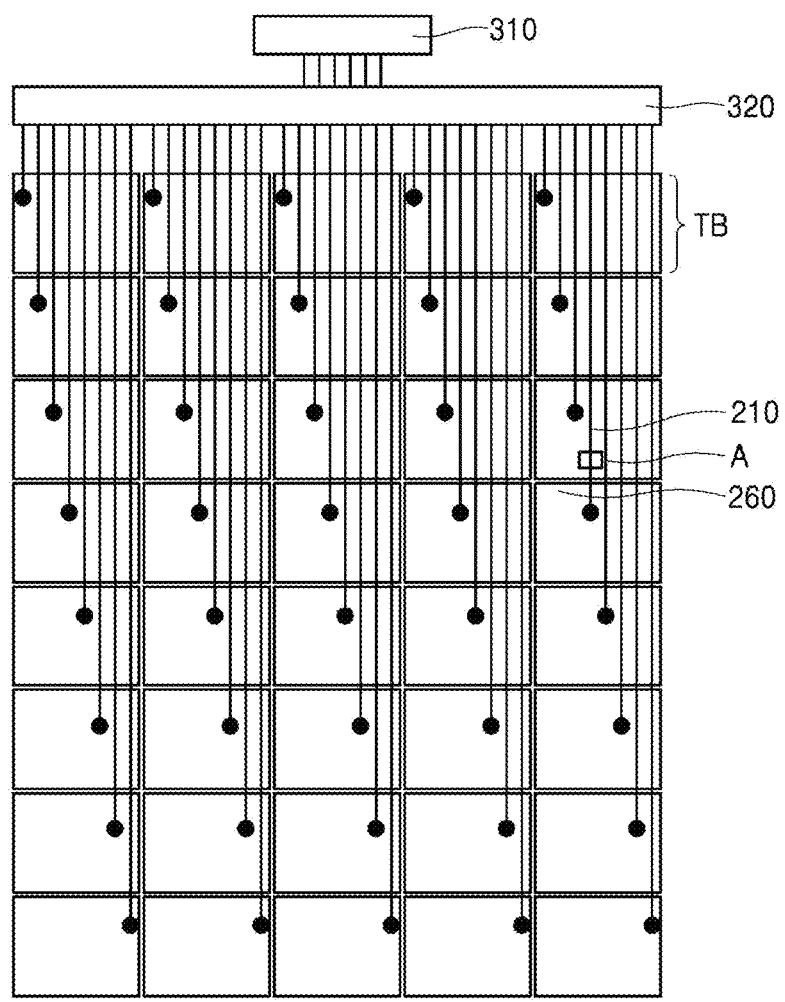
FIG. 5 schematically shows a structure of a touch block and a touch line.

FIG. 5 schematically shows a structure of a touch block and a touch line.

In FIG. 5, a reference numeral 310 denotes a data driver and a reference numeral 320 denotes a MUX. The data driver 310 converts an image signal DATA input from a timing control IC disposed in an external system (not shown) into frame based digital image data R, G, and B, and converts the digital image data R, G, and B to analog data voltages and supplies the same to the display device.

As shown in FIG. 5, the common electrode 260 may be divided into a plurality of touch blocks TB, each corresponding to some pixel areas among a plurality of pixel areas. The touch line 210 may be electrically connected to the common electrode on a touch block basis.

The touch line 210 extends across the touch block TB of the common electrode 260 and is disposed under the common electrode 260 as shown in FIG. 4. Thus, the touch line 210 senses change in a load of a capacitance that occurs when a finger touches the touch block TB, and transfers the change to a sensing circuit.

The touch line 210 is independently connected to the common electrode 260 of each touch block TB. The common electrode 260 supplies a common voltage to each pixel area for a display period, and a touch sensing signal thereto for a non-display period such that the touch line detects whether the finger touches the common electrode 260.

The touch sensing signal supplied through the touch line 210 may be a plurality of clock signals CLK. When the user touches the display area using the finger, the touch capacitance may be generated between the touch blocks TB of the common electrodes 260. In this connection, the touch capacitance according to the user's touch and a reference capacitance may be compared to each other. Then, the user's touch position may be detected based on the comparison result. An operation is performed according to the detected touch position.

In this connection, via the comparison between the touch capacitance and the reference capacitance, coordinates of the position where the user's touch has occurred is recognized. An operation corresponding to the coordinates of the touch-occurrence position is performed.

Examples

Hereinafter, preferred examples are presented to help understanding of the present disclosure. However, the following examples are only provided to allow the skilled person to the art to understand the present disclosure more easily. The present disclosure is not limited to the following examples.

Figure 6:
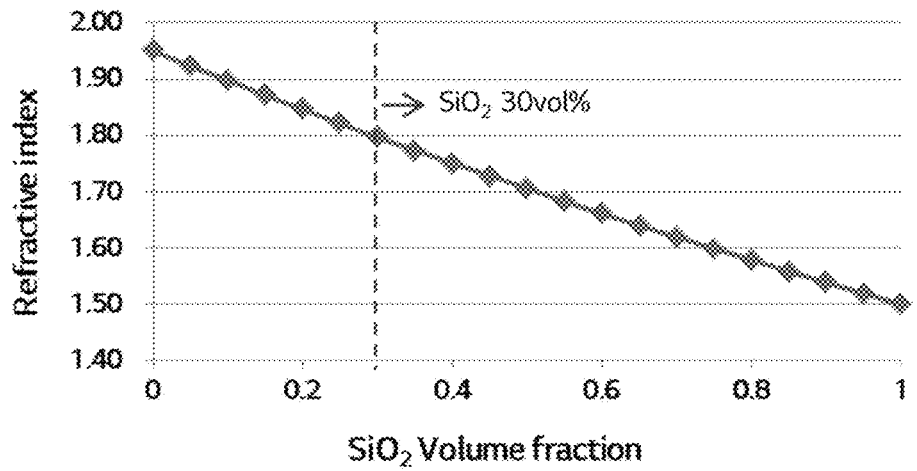
FIG. 6 is a graph showing a measurement result of a refractive index of a $SiO_2$ doped $In_2O_3$ film based on a $SiO_2$ content.

FIG. 6 is a graph showing a measurement result of a refractive index of a $SiO_2$ doped $In_2O_3$ film based on $SiO_2$ content. This may be derived based on a following Equation 1 in which a refractive index of a material having a multi-component composition is determined based on a content ratio between materials having refractive indexes, respectively:

$$\frac{n_{12}^2 - 1}{n_{12}^2 + 2} = \phi_1 \frac{n_1^2 - 1}{n_1^2 + 2} + \phi_2 \frac{n_2^2 - 1}{n_2^2 + 2} \quad \text{[Equation 1]}$$

In this connection, $n_{12}$ denotes a refractive index of a mixture of material 1 and material 2, $n_1$ refers to a refractive index of material 1, $n_2$ refers to a refractive index of material 2, $\Phi_1$ denotes a volume fraction of material 1, and $\Phi_2$ denotes a volume fraction of material 2.

Referring to FIG. 6, it may be seen that when applying a refractive index of 1.95 of $In_2O_3$ and a refractive index of 1.5 of $SiO_2$, a refractive index decreases as the $SiO_2$ content increases. In particular, it may be seen that the refractive index of the upper film may be 1.8 or smaller when $SiO_2$ is contained in a volume fraction of 30% or greater (about 13% or greater by weight).

Figure 7:
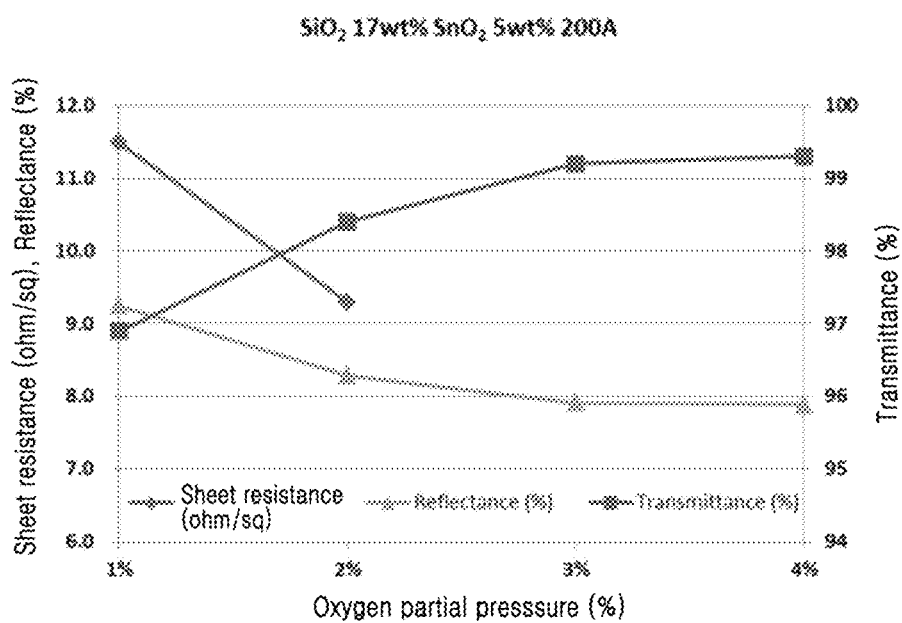
FIG. 7 is a graph showing measurement results of sheet resistance, reflectance and transmittance of a $SiO_2$—$SnO_2$ doped $In_2O_3$ film based on an oxygen partial pressure under conditions of 78% by weight of $In_2O_3$, 17% by weight of $SiO_2$, 5% by weight of $SnO_2$, and 200 Å of a film thickness.

FIG. 7 is a graph showing measurement results of sheet resistance, reflectance and transmittance of a $SiO_2$—$SnO_2$ doped $In_2O_3$ film based on an oxygen partial pressure under conditions of 78% by weight of $In_2O_3$, 17% by weight of $SiO_2$, 5% by weight of $SnO_2$, and 200 Å of a film thickness. The upper film made of $In_2O_3$ and doped with $SiO_2$—$SnO_2$ was deposited using a vacuum deposition method.

In FIGS. 7 to 12, a scale of sheet resistance is a logarithmic scale.

Referring to FIG. 7, it may be seen that when the oxygen partial pressure increases during the vacuum deposition under conditions of 78% by weight of $In_2O_3$, 17% by weight of $SiO_2$, 5% by weight of $SnO_2$, and 200 Å of a film thickness, the transmittance increases, the reflectance decreases, and the sheet resistance decreases. However, it may be seen that the resistance of the upper film is higher than $10^9$ Ω/sq due to a fact that 17% by weight of $SiO_2$ is contained.

Figure 8:
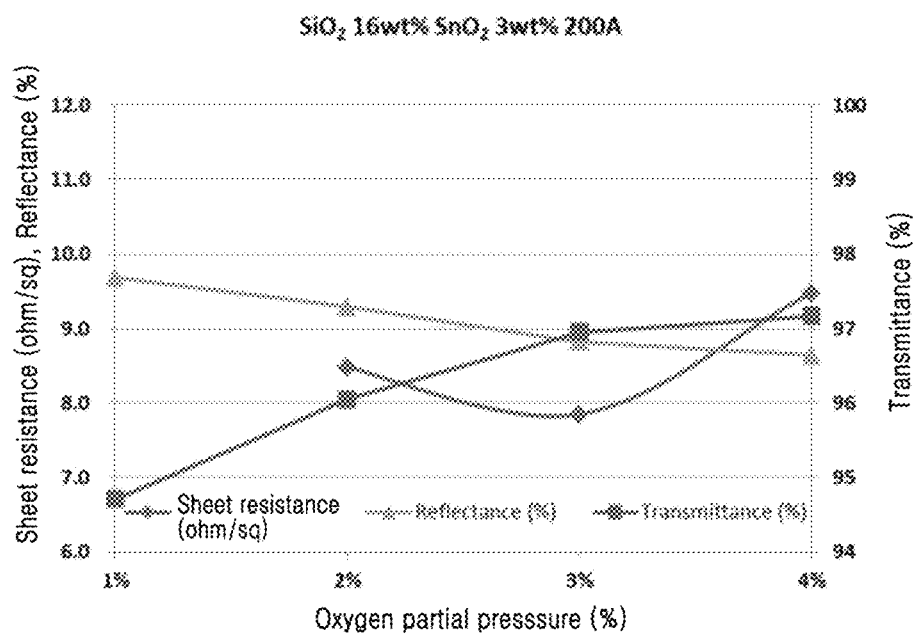
FIG. 8 is a graph showing measurement results of sheet resistance, reflectance and transmittance of a $SiO_2$—$SnO_2$ doped $In_2O_3$ film based on an oxygen partial pressure under conditions of 81% by weight of $In_2O_3$, 16% by weight of $SiO_2$, 3% by weight of $SnO_2$, and 200 Å of a film thickness.

FIG. 8 is a graph showing measurement results of sheet resistance, reflectance and transmittance of a $SiO_2$—$SnO_2$ doped $In_2O_3$ film based on an oxygen partial pressure under conditions of 81% by weight of $In_2O_3$, 16% by weight of $SiO_2$, 3% by weight of $SnO_2$, and 200 Å of a film thickness.

Referring to FIG. 8, it may be seen that when the oxygen partial pressure increases during vacuum deposition pressure under conditions of 81% by weight of $In_2O_3$, 16% by weight of $SiO_2$, 3% by weight of $SnO_2$, and 200 Å of a film thickness, the transmittance increases and the reflectance decreases. However, even in FIG. 8, it may be seen that the resistance of the upper film is higher than about $10^8$ Ω/sq due to the inclusion of 16% by weight of $SiO_2$.

Figure 9:
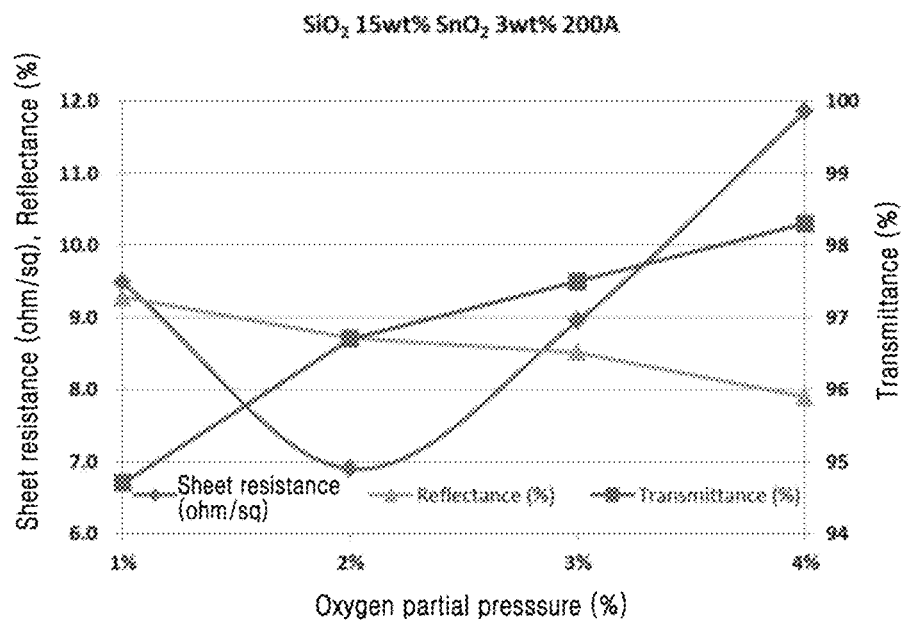
FIG. 9 is a graph showing measurement results of sheet resistance, reflectance and transmittance of a $SiO_2$—$SnO_2$ doped $In_2O_3$ film based on an oxygen partial pressure under conditions of 82% by weight of $In_2O_3$, 15% by weight of $SiO_2$, 3% by weight of $SnO_2$, and 200 Å of a film thickness.

FIG. 9 is a graph showing measurement results of sheet resistance, reflectance and transmittance of a $SiO_2$—$SnO_2$ doped $In_2O_3$ film based on an oxygen partial pressure under conditions of 82% by weight of $In_2O_3$, 15% by weight of $SiO_2$, 3% by weight of $SnO_2$, and 200 Å of a film thickness.

Referring to FIG. 9, it may be seen that when the oxygen partial pressure increases during vacuum deposition under conditions of 82% by weight of $In_2O_3$, 15% by weight of $SiO_2$, 3% by weight of $SnO_2$, and 200 Å of a film thickness, the transmittance increases and the reflectance decreases. Further, referring to FIG. 9, it may be seen that when vacuum deposition is performed under 2 vol % oxygen partial pressure, the upper film having a sheet resistance of about $10^7$ Ω/sq may be formed.

Figure 10:
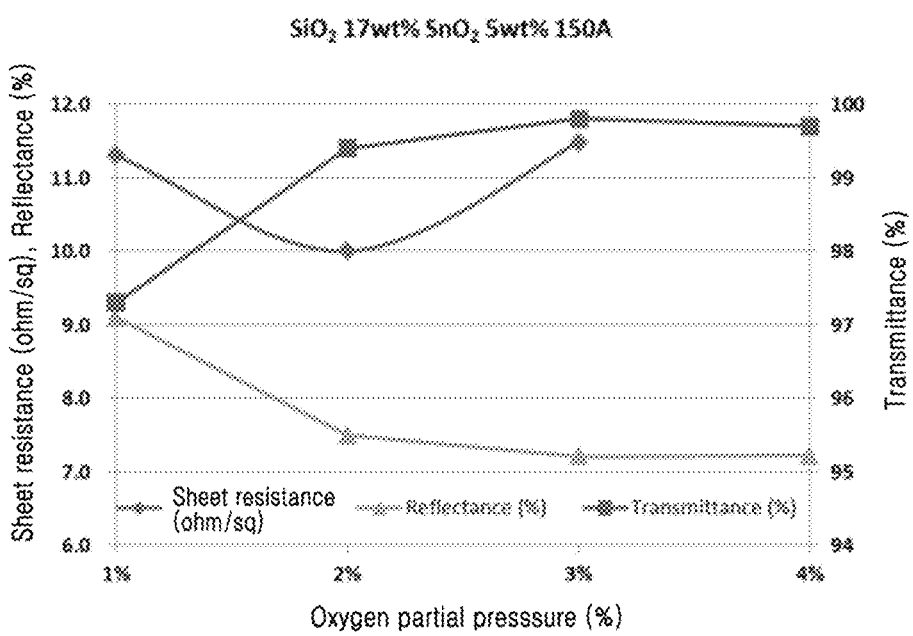
FIG. 10 is a graph showing measurement results of sheet resistance, reflectance and transmittance of a $SiO_2$—$SnO_2$ doped $In_2O_3$ film based on an oxygen partial pressure under conditions of 78% by weight of $In_2O_3$, 17% by weight of $SiO_2$, 5% by weight of $SnO_2$, and 150 Å of a film thickness.

FIG. 10 is a graph showing measurement results of sheet resistance, reflectance and transmittance of a $SiO_2$—$SnO_2$ doped $In_2O_3$ film based on an oxygen partial pressure under conditions of 78% by weight of $In_2O_3$, 17% by weight of $SiO_2$, 5% by weight of $SnO_2$, and 150 Å of a film thickness.

Referring to FIG. 10, it may be seen that when the oxygen partial pressure increases during vacuum deposition under conditions of 78% by weight of $In_2O_3$, 17% by weight of $SiO_2$, 5% by weight of $SnO_2$, and 150 Å of a film thickness, the transmittance increases, the reflectance decreases, and the sheet resistance decreases. Further, it may be seen that when comparing FIGS. 7 and 10 of the same composition with each other, relatively high transmittance and relatively low reflectance are exhibited as the thickness of the upper film decreases.

However, referring to FIG. 10, it may be seen that the resistance of the upper film is higher than about $10^{10}$ Ω/sq due to the fact that 17% by weight of $SiO_2$ is contained.

Figure 11:
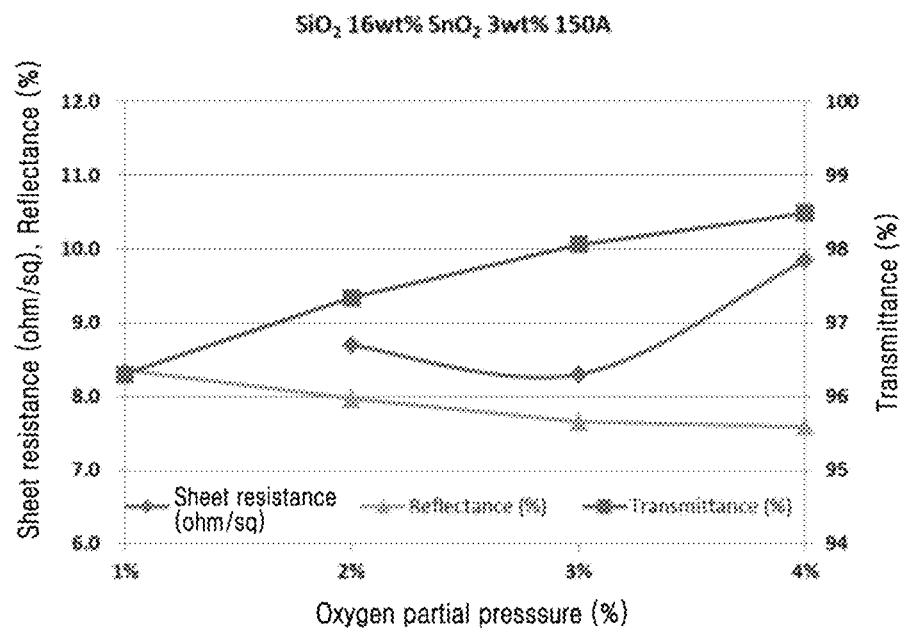
FIG. 11 is a graph showing the measurement results of sheet resistance, reflectance and transmittance of a $SiO_2$—$SnO_2$ doped $In_2O_3$ film based on an oxygen partial pressure under conditions of 81% by weight of $In_2O_3$, 16% by weight of $SiO_2$, 3% by weight of $SnO_2$, and 150 Å of a film thickness.

FIG. 11 is a graph showing the measurement results of sheet resistance, reflectance and transmittance of a $SiO_2$—$SnO_2$ doped $In_2O_3$ film based on an oxygen partial pressure under conditions of 81% by weight of $In_2O_3$, 16% by weight of $SiO_2$, 3% by weight of $SnO_2$, and 150 Å of a film thickness.

Referring to FIG. 11, it may be seen that when the oxygen partial pressure increases during vacuum deposition under conditions of 81% by weight of $In_2O_3$, 16% by weight of $SiO_2$, 3% by weight of $SnO_2$, and 150 Å of a film thickness, the transmittance increases, the reflectance decreases, and the sheet resistance decreases. Further, it may be seen that when comparing FIGS. 8 and 11 of the same composition with each other, relatively high transmittance and relatively low reflectance are exhibited as the thickness of the upper film decreases.

However, referring to FIG. 11, it may be seen that the resistance of the upper film is higher than $10^8$ Ω/sq due to the fact that 16% by weight of $SiO_2$ is contained.

Figure 12:
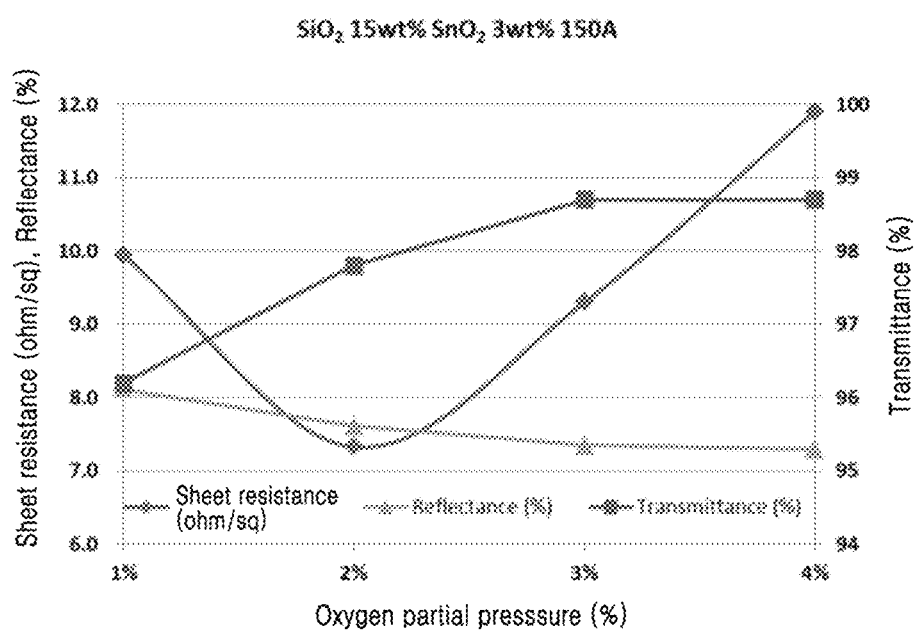
FIG. 12 is a graph showing measurement results of sheet resistance, reflectance and transmittance of a $SiO_2$—$SnO_2$ doped $In_2O_3$ film based on an oxygen partial pressure under conditions of 82% by weight of $In_2O_3$, 15% by weight of $SiO_2$, 3% by weight of $SnO_2$, and 150 Å of a film thickness.

FIG. 12 is a graph showing measurement results of sheet resistance, reflectance and transmittance of a $SiO_2$—$SnO_2$ doped $In_2O_3$ film based on an oxygen partial pressure under conditions of 82% by weight of $In_2O_3$, 15% by weight of $SiO_2$, 3% by weight of $SnO_2$, and 150 Å of a film thickness.

Referring to FIG. 12, it may be seen that when the oxygen partial pressure increases during vacuum deposition under conditions of 82% by weight of $In_2O_3$, 15% by weight of $SiO_2$, 3% by weight of $SnO_2$, and 150 Å of a film thickness, the transmittance increases, the reflectance decreases, and the sheet resistance decreases. Further, it may be seen that when comparing FIGS. 9 and 12 of the same composition with each other, relatively high transmittance and relatively low reflectance are exhibited as the thickness of the upper film decreases.

Further, referring to FIG. 12, it may be seen that the upper film having the sheet resistance of about $10^7$ Ω/sq may be formed under a condition of 2 vol % oxygen partial pressure during the vacuum deposition. This is due to the inclusion of 15% by weight of $SiO_2$.

Referring to the results of FIGS. 7 to 12, it may be seen that when the $SiO_2$ content is higher than 15% by weight, the sheet resistance of the upper film is remarkably high irrespective of other conditions. Thus, it is difficult to obtain a target sheet resistance of $10^6$ to $10^8$ Ω/sq.

When the $SiO_2$ content is lowered to 15% by weight, the transmittance decreases and the reflectance increases, while a variation thereof is small. Decreasing the film thickness has the effect of increasing the transmittance and reducing the reflectance. Thus, the transmittance decrease and the reflectance increase due to the decrease of $SiO_2$ content may be minimized by reducing the film thickness.

Figure 13:
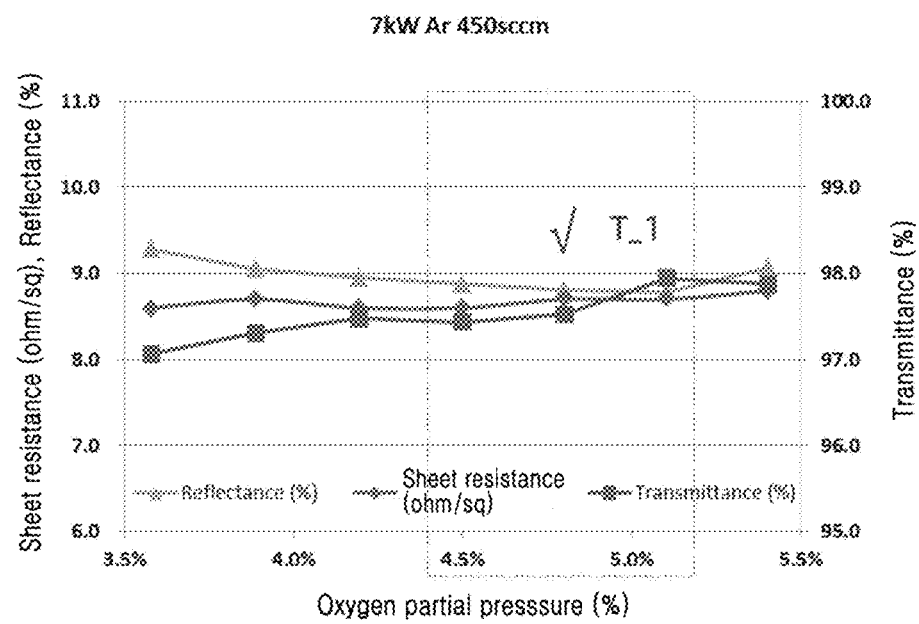
FIG. 13 is a graph showing measurement results of sheet resistance, reflectance and transmittance of $SiO_2$—$SnO_2$ doped $In_2O_3$ film (T_1) based on $O_2$ partial pressure under 7 kW, and Ar 450 sccm conditions.

FIG. 13 is a graph showing measurement results of sheet resistance, reflectance and transmittance of $SiO_2$—$SnO_2$ doped $In_2O_3$ film (T_1) based on $O_2$ partial pressure under 7 kW, and Ar 450 sccm conditions.

The composition of the upper film was $In_2O_3$ 82% by weight, $SiO_2$ 15% by weight, $SnO_2$ 3% by weight, and the film thickness was 150 Å.

Referring to FIG. 13, it may be seen that the transmittance tends to increase and the reflectance tends to decreases while a variation thereof is small, as the oxygen partial pressure increases during the vacuum deposition under conditions of 7 kW and Ar 450 sccm. Further, it may be seen that the change in the resistance value is not large.

Figure 14:
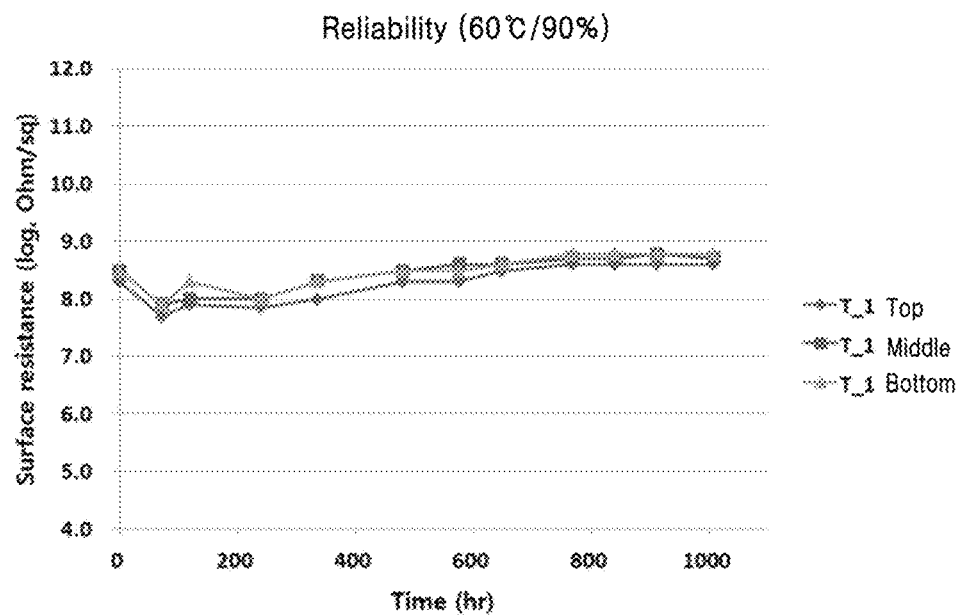
FIG. 14 is a graph showing a measurement result of sheet resistance of a $SiO_2$—$SnO_2$ doped $In_2O_3$ film (T_1) manufactured under a condition of 4.8% $O_2$ partial pressure in FIG. 13, over time, at a temperature of 60° C. and a relative humidity of 90%.

FIG. 14 is a graph showing a measurement result of sheet resistance of a $SiO_2$—$SnO_2$ doped $In_2O_3$ film (T_1) manufactured under a condition of 4.8% $O_2$ partial pressure in FIG. 13, over time, at a temperature of 60° C. and a relative humidity of 90%.

Referring to FIG. 14, it may be seen that the change in each of the sheet resistance, the transmittance, and the reflectance of each of top, middle, and bottom faces of the upper film over time under high temperature and high humidity conditions is not significant.

Figure 15:
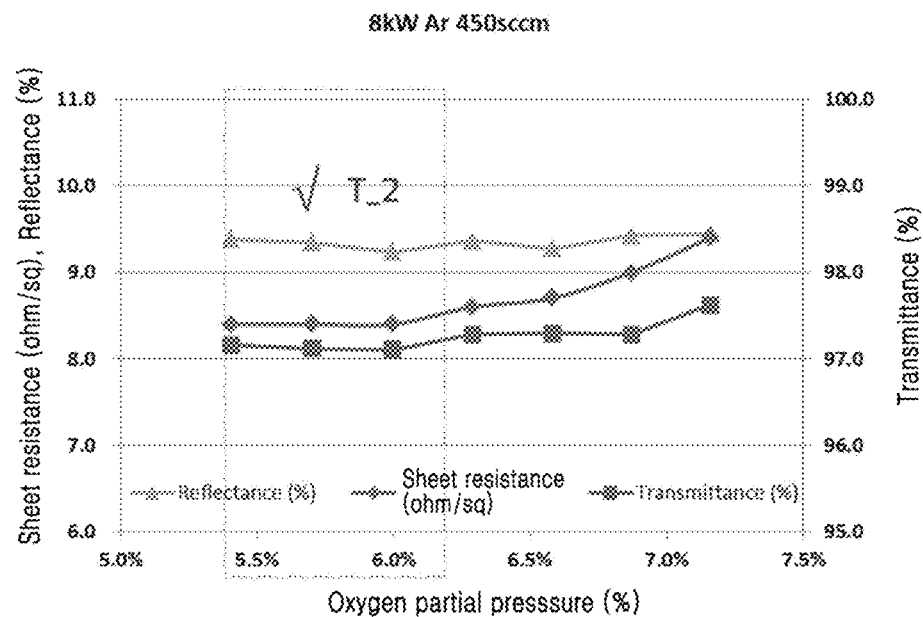
FIG. 15 is a graph showing measurement results of sheet resistance, reflectance and transmittance of $SiO_2$—$SnO_2$ doped $In_2O_3$ film (T_2) based on $O_2$ partial pressure under 8 kW, and Ar 450 sccm conditions.
Figure 16:
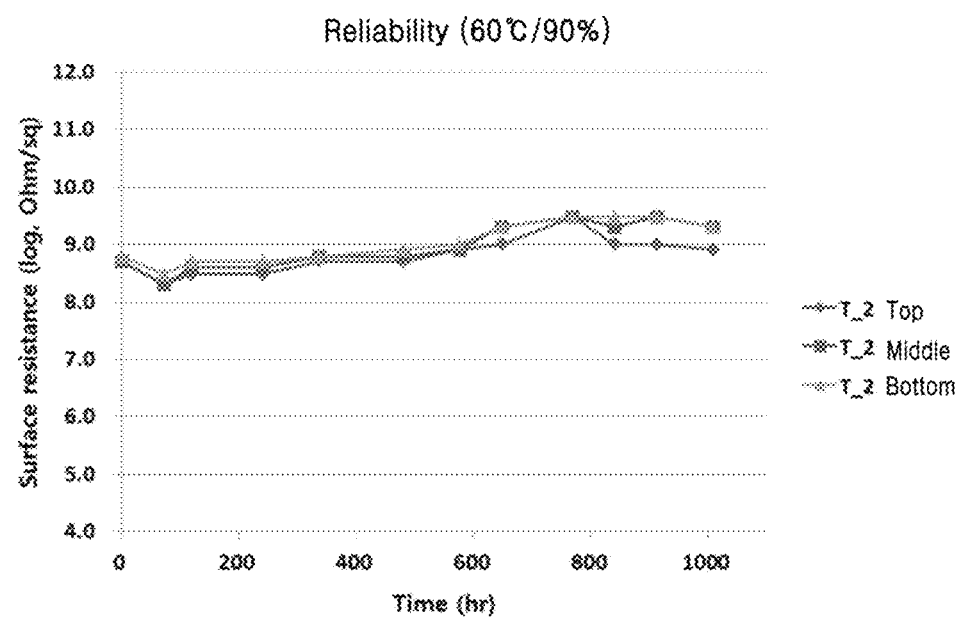
FIG. 16 is a graph showing a measurement result of sheet resistance of a $SiO_2$—$SnO_2$ doped $In_2O_3$ film (T_2) manufactured under a condition of 5.7% $O_2$ partial pressure in FIG. 15, over time, at a temperature of 60° C. and a relative humidity of 90%.

FIG. 15 is a graph showing measurement results of sheet resistance, reflectance and transmittance of $SiO_2$—$SnO_2$ doped $In_2O_3$ film (T_2) based on $O_2$ partial pressure under 8 kW, and Ar 450 sccm conditions. FIG. 16 is a graph showing a measurement result of sheet resistance of a $SiO_2$—$SnO_2$ doped $In_2O_3$ film (T_2) manufactured under a condition of 5.7% $O_2$ partial pressure in FIG. 15, over time, at a temperature of 60° C. and a relative humidity of 90%.

The composition of the upper film was $In_2O_3$ 82% by weight, $SiO_2$ 15% by weight, $SnO_2$ 3% by weight, and the film thickness was 150 Å.

Referring to FIG. 15, it may be seen that the transmittance slightly increases while there is little change in the reflectance as the oxygen partial pressure increases during the vacuum deposition under the conditions of 8 kW and Ar 450 sccm. Further, it may be seen that the change in the resistance value is not large.

Further, referring to FIG. 16, it may be seen that the change in each of the sheet resistance, the transmittance, and the reflectance of each of top, middle, and bottom faces of the upper film over time under high temperature and high humidity conditions is not significant.

In addition, it may be seen that based on the comparison result between FIG. 13 and FIG. 15, the power condition applied during the vacuum deposition does not significantly affect film quality.

Figure 17:
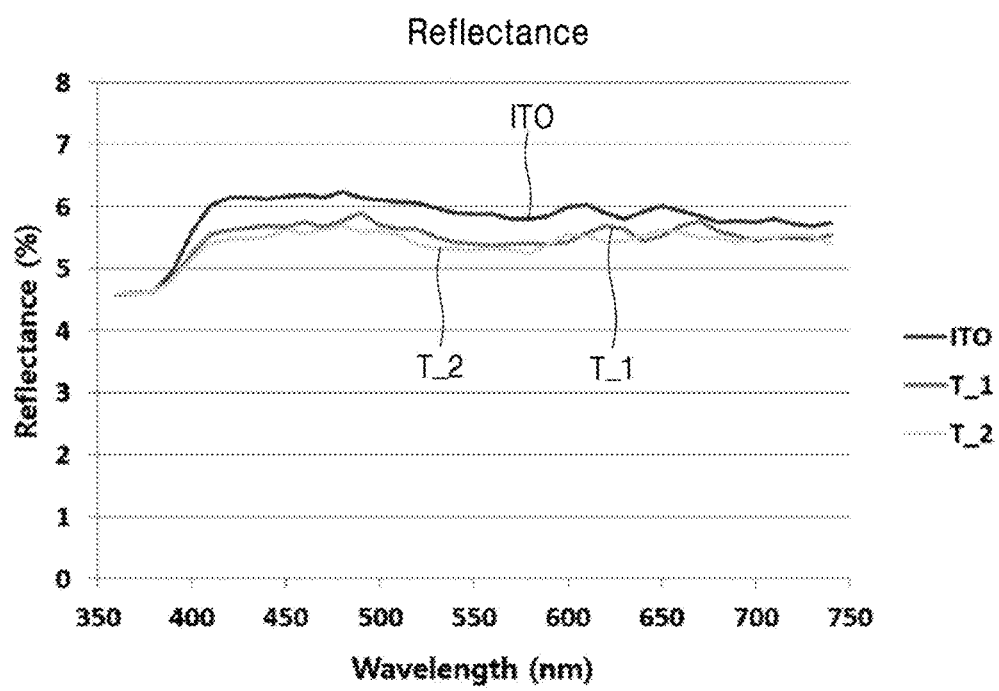
FIG. 17 shows reflectance measurement results of a ITO film, a T_1 film, and a T_2 film based on a wavelength.

FIG. 17 shows reflectance measurement results of a ITO film, a T_1 film, and a T_2 film based on a wavelength.

Referring to FIG. 17, an average reflectance of the ITO film in a visible light region (a wavelength of 360 to 740 nm) exhibited 5.81%, while those of the T_1 and T_2 films exhibited relatively low reflectance 5.47% and 5.38%, respectively.

When the $SiO_2$—$SnO_2$ doped $In_2O_3$ film is applied to the upper film of the color filter substrate according to the present disclosure, lower reflectance may be achieved than that when applying the ITO upper film. Thus, the configuration that the $SiO_2$—$SnO_2$ doped $In_2O_3$ film is applied to the upper film of the color filter substrate is more suitable for implementing a low-reflective display device.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A color filter substrate comprising:
a first substrate;
a color filter on one face of the first substrate;
an upper film on the other face of the first substrate, and
a polarizing plate on one face of the upper film,
wherein the upper film comprises a transparent conductive material doped with an oxide, the oxide including at least $SiO_2$.

2. The color filter substrate of claim 1, wherein the oxide includes both $SiO_2$ and $SnO_2$.

3. The color filter substrate of claim 1, wherein the transparent conductive material is $In_2O_3$.

4. The color filter substrate of claim 1, wherein the upper film contains 13 to 15% by weight of $SiO_2$ and 10% or less by weight of $SnO_2$ and valence of $In_2O_3$.

5. The color filter substrate of claim 1, wherein the upper film has a sheet resistance of $10^6$ to $10^8$ Ω/sq.

6. The color filter substrate of claim 1, wherein the upper film has a thickness of 50 to 200 Å.

7. The color filter substrate of claim 1, wherein the polarizing plate has no conductive material coating.

8. The color filter substrate of claim 1, wherein the upper film has a transmittance of 97% or greater.

9. The color filter substrate of claim 1, wherein the upper film has a reflectance of 9.5% or smaller.

10. An in-cell touch type display device comprising:
a device substrate in which a plurality of pixel areas are defined, wherein a thin-film transistor and a touch line are disposed on the device substrate; and
a color filter substrate disposed on the device substrate, wherein the color filter substrate includes:
a first substrate;
a color filter on one face of the first substrate;
an upper film on the other face of the first substrate, and
a polarizing plate on one face of the upper film,
wherein the upper film comprises a transparent conductive material doped with an oxide, the oxide including at least $SiO_2$.

11. The in-cell touch type display device of claim 10, wherein the oxide includes both $SiO_2$ and $SnO_2$ and the transparent conductive material is $In_2O_3$.

12. The in-cell touch type display device of claim 10, wherein the upper film contains 13 to 15% by weight of $SiO_2$ and 10% or less by weight of $SnO_2$ and valence of $In_2O_3$.

13. The in-cell touch type display device of claim 10, wherein the device substrate includes:
a second substrate;
a gate line and a data line disposed on a top face of the second substrate and intersecting with each other to define a pixel area;
a thin-film transistor disposed in an intersection between the gate line and the data line;
a protective layer disposed on a top face of the thin-film transistor;
a pixel electrode disposed on a top face of the protective layer and connected to a drain electrode of the thin-film transistor;
a common electrode overlapping with the pixel electrode; and
a touch line electrically connected to the common electrode.

14. The in-cell touch type display device of claim 13, wherein the common electrode is divided into a plurality of touch blocks, each block including one or more pixel areas among a plurality of pixel areas.

15. The in-cell touch type display device of claim 14, wherein each touch line is electrically connected to each of the touch blocks of the common electrode.

16. The in-cell touch type display device of claim 10, wherein the upper film has a sheet resistance of $10^6$ to $10^8$ Ω/sq.

17. The in-cell touch type display device of claim 10, wherein the upper film has a thickness of 50 to 200 Å.

18. The in-cell touch type display device of claim 10, wherein the polarizing plate has no conductive material coating.

19. The in-cell touch type display device of claim 10, wherein the upper film has a transmittance of 97% or greater.

20. The in-cell touch type display device of claim 10, wherein the upper film has a reflectance of 9.5% or smaller.

* * * * *